3,501,390
PROCESS FOR ELECTROCOATING AND
POLYMERIZING BY RADIATION
Allen H. Turner, Ann Arbor, Mich., assignor to Ford
Motor Company, Dearborn, Mich., a corporation of
Delaware
Filed Oct. 3, 1966, Ser. No. 583,834
Int. Cl. C23b 13/00; B01k 5/02
U.S. Cl. 204—181 13 Claims

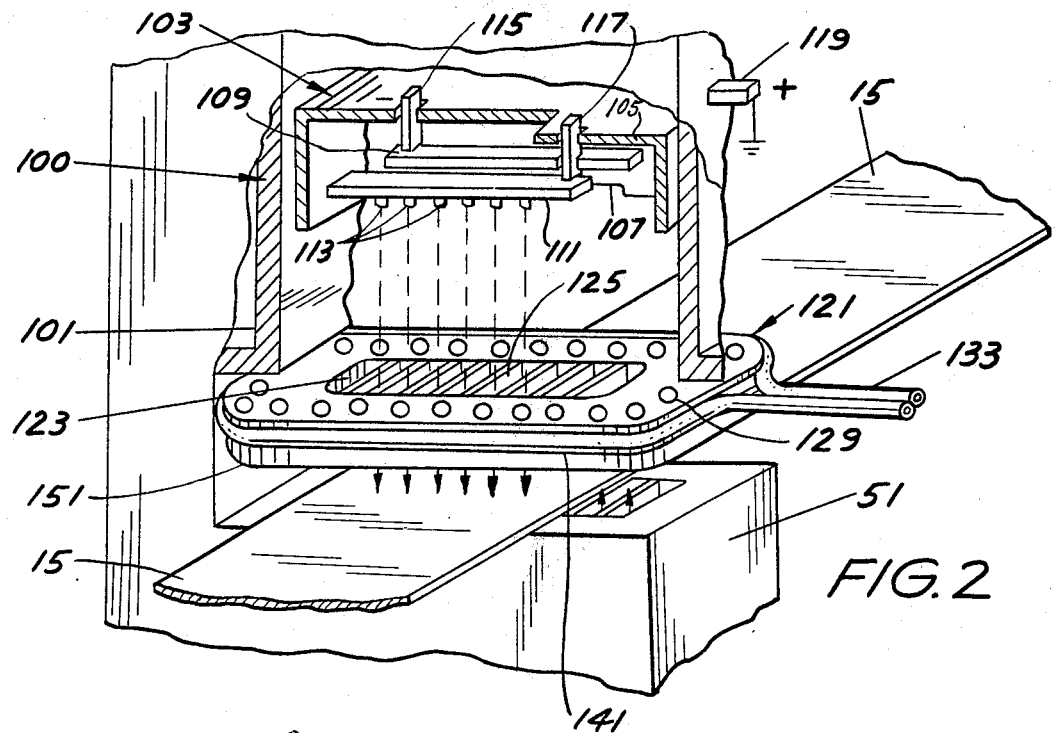
FIG. 2
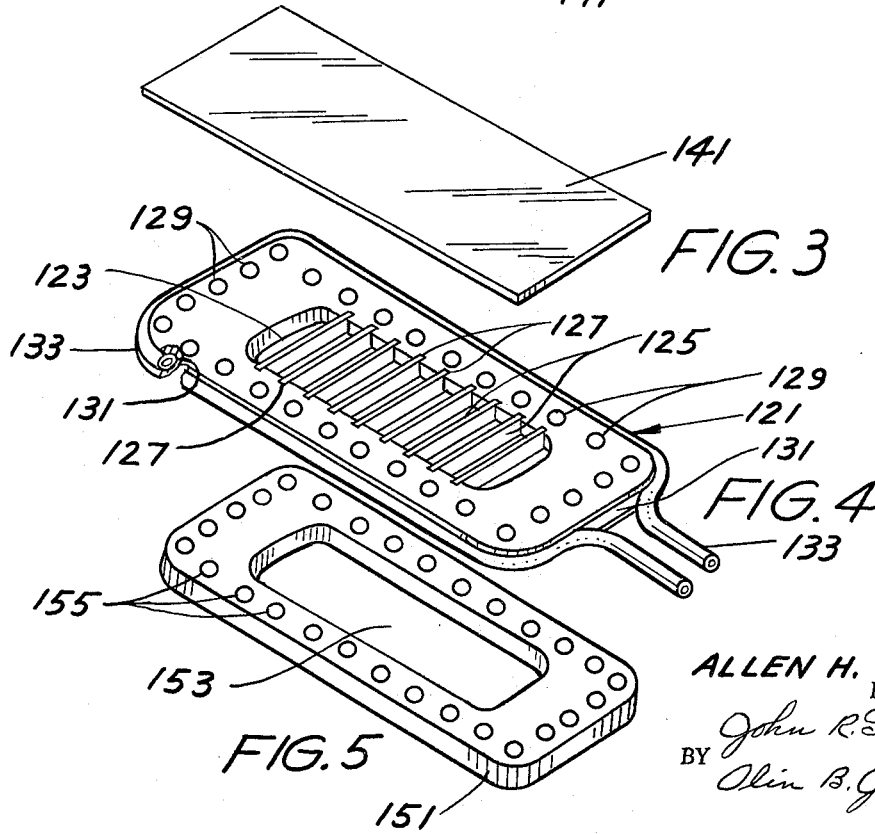
FIG. 3
FIG. 4
FIG. 5
ALLEN H. TURNER
INVENTOR.
BY John R. Faulkner
Olin B. Johnson
ATTORNEYS United States Patent Office 3,501,390
Patented Mar. 17, 1970

ABSTRACT OF THE DISCLOSURE

Electroconductive objects are electrocoated with a water-ionizable amino compound and a film-forming, polymerizable, organic coating material, at least a major proportion of which is a polycarboxylic acid resin. The coated article is passed through a liquid seal into an inert gas-containing irradiation zone and is subjected to high energy ionizing radiation to effect polymerization of the coating.

This invention relates to the art of coating. In particular this invention is concerned with polymerization of a freshly applied film of paint binder by irradiation in a controlled atmosphere. More particularly, this invention relates to a novel method for coating electrically conductive objects by electrically induced deposition of the binder within an aqueous medium followed immediately by polymerization of the resultant binder film by passing the film through a beam of polymerization effecting electrons in a substantially oxygen-free atmosphere controlled by means hereinafter described.

Radiation induced polymerization, including the use of an electron beam as the source of radiant energy, is exemplified in the art by U.S. Patents 3,247,012; 3,188,229; 3,188,228; 3,188,165; 3,170,892; 3,146,146; 3,137,674; 3,131,139; 3,107,206; 3,088,791; 3,077,420; 3,077,419; 3,077,418; 3,077,417; 3,075,904; 3,013,895; 2,999,056; 2,964,456; 2,956,904; 2,955,953; 2,921,006; 2,904,481; and 2,900,277. Oxygen tends to inhibit such polymerization and the process is more efficiently carried out in a gaseous medium offering substantially less resistance to electron projection than air. If the intervening medium is air, the average beam energy drops rapidly, i.e. a loss equivalent to reducing the potential several thousand volts per inch of intervening air, and an increasing proportion of the beam is completely attenuated before reaching the workpiece.

In the preferred embodiment of this invention, an alpha-beta, olefinically unsaturated, coating material, at least a major proportion of which is a polycarboxylic acid resin ionizable in aqueous solution of water-ionizable amino-compound is dispersed in an aqueous solution of amino compound, the resultant ionized resin is electrodeposited upon an electrically conductive workpiece moving through the bath by providing a difference of electrical potential between such workpiece and another electrode in contact with the bath, the resultant workpiece is passed from said bath through a liquid seal into a controlled atmosphere, preferably a light inert gas, the freshly deposited coating is polymerized upon the surface of such workpiece in such atmosphere with ionizing radiation, and the polymerized coating passed from said atmosphere through a second liquid seal to the outside air.

This invention will be more easily understood by reading the following detailed description in connection with the accompanying drawings, wherein:

FIGURE 2 is a partial schematic assembly view of one embodiment of one of the two electron emission units shown in FIGURE 1;

FIGURE 3 is a sheet of metal foil which serves as the electron window of the device shown in FIGURE 2;

FIGURE 4 is a perspective view of one embodiment of a combination window-support grid and heat sink which forms a part of the device shown in FIGURE 2 and provides support for the electron window of FIGURE 3;

FIGURE 5 is a perspective view of an apertured window-retaining member which frames the electron window of FIGURES 2 and 3 and holds such window in contact with the window-support grid and heat sink of FIGURE 4; and, FIGURE 6 is a view taken along line 6—6 of FIGURE 1.

Figure 1:
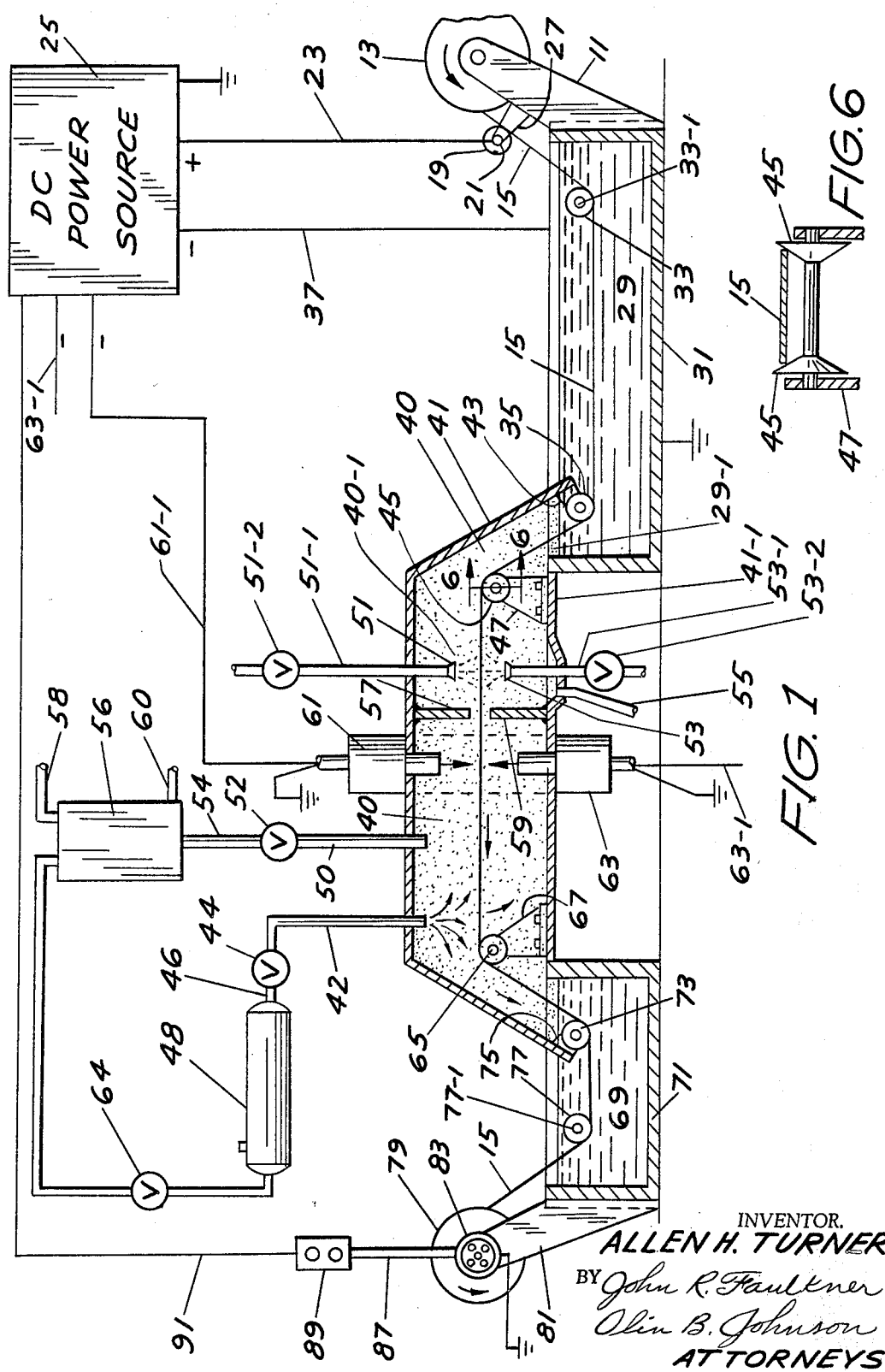
FIGURE 1 is a schematic view of one embodiment of apparatus which may be used in carrying out the method of this invention, portions thereof being shown in section.

Referring now to FIGURE 1, a reel support stand 11 supports stock supply reel 13. Reel 13 formed of a suitable nonconductor, e.g. wood, plastic, etc., is rotatably mounted on stand 11 and carries a metal sheet stock 15. The metal sheet stock on reel 13 is insulated from ground. Upon being unwound from reel 13, the sheet stock 15 passes under a brush or roller contact 19. Contact 19 is in electrical contact with a metal shaft 21 which in turn is in electrical connection via conductor 23 with a positive terminal of a direct current electrical power source 25 and is supported by support arm 27 mounted on stand 11. Support arm 27 in a first embodiment is a nonconductor. If formed of conductive material, support arm 27 is insulated from contact 19 by insulation means, not shown. Thus, both the sheet stock on reel 13 and contact 19 are insulated from ground. After passing under contact 19, sheet stock 15 enters aqueous coating bath 29 in coating tank 31. Coating tank 31 is grounded and in electrical connection with power source 25 via conductor 37. It then passes under idler 33 and idler 35 before exiting from bath 29 into the controlled atmosphere of polymerization chamber 40 within housing 41. Idler 35 is electrically insulated from and supported by housing 41 via support member 43. Idler 35 is insulated from and supported by tank 31 by nonconductive support means 33-1. In the alternative, idler 33 is supported by overhead suspension means, not shown.

Bath 29 comprises an aqueous dispersion of paint binder as hereinafter defined and water-ionizable amino compound. The composition of the coating bath is hereinafter described in greater detail. Tank 31 serves as the grounded cathode of an electrodeposition cell. Sheet stock 15 serves as the anode of such cell.

A difference of electrical potential is maintained between sheet stock 15 and tank 31 that is in excess of the threshold deposition voltage of the resin employed. As used herein, the terms "threshold deposition voltage" or "threshold voltage" refer to the minimum voltage in which essentially electrically irreversible deposition of the given resin is initiated. This will vary somewhat with the resin employed and/or the composition of the resin-amino compound dispersion. A high threshold deposition voltage is characteristic of a more stable dispersion. This minimum voltage will ordinarily be above about 5 volts and below about 20 volts. However, for practical residence times for most industrial coating operations, a voltage above about 50 volts will be required. Advantageously, this voltage will be in the range of about 100 to about 250 volts. An upper limit on this difference of potential is dictated by the potential at which the deposited film will rupture if maintained throughout the bath residence period. This will also vary with the given resin but will ordinarily be below about 500 volts.

The sheet stock 15 emerges from bath 29 into the controlled atmosphere of polymerization chamber 40 bearing a continuous resin-comprising coating of substantially even depth. The resin-comprising coating at this point in the process has not been cured and is relatively easily marred by physical contact. This coating should be handled as little as possible prior to polymerization. Housing 41 which substantially encloses polymerization chamber 40 extends into bath 29 providing a water seal for the gas in chamber 40 at the surface 29–1 of bath 29. By entering chamber 40 via this water seal, the transfer of coated sheet stock 15 from the aqueous medium of bath 29 into the gaseous medium of chamber 40 is effected without contact with a solid object. The idlers hereinbefore and hereinafter mentioned are constructed and arranged to effect minimum contact with the sheet stock 15. One embodiment of these idlers is hereinafter discussed in detail with the description of FIGURE 6. The coated sheet stock 15 upon entering polymerization chamber 40 passes over idler 45 which is electrically insulated from and supported by support stand 47 which is turn is supported by floor 41–1 of housing 41 which extends along the bottom of polymerization chamber 40. After passing over idler 45 the sheet stock 15 passes through a rinse zone 40–1 of polymerization chamber 40 where the water resistant coating is rinsed with water to remove loosely adhered material from the coating bath via shower means 51 and 53 disposed on opposite sides of its path. Shower means 51 and 53 are mounted on and supplied with water by controls 51–1 and 53–1 respectively. The flow of water through such conduits is controlled via valves 51–2 and 53–2 respectively. The rinse water escapes from chamber 40 via drain 55. The sheet stock 15 then passes between baffles 57 and 59 which restrict the rinse water to rinse zone 40–1 and divert drainage of the same toward drain 55.

The coated sheet stock 15 then passes between oppositely disposed electron emission units 61 and 63, hereinafter described in greater detail, which respectively direct electron beams against the coated surface initiating polymerization thereof. Units 61 and 63 are in electrical connection with a negative terminal of power source 25 via conductors 61–1 and 63–1 respectively. The positive electrodes of these units are in electrical connection with ground. The irradiated sheet stock then passes over idler 65 which is insulated from and supported by idler support 67 which in turn is supported by floor 41–1 of housing 41. Housing 41 also extends into water bath 69 in tank 71 providing a water seal at the surface 69–1 of bath 69. In an alternative embodiment, the water seal afforded by bath 69 is omitted and sheet stock 15 emerges into the outside air through an opening in housing 41 slightly larger and of the same cross sectional configuration as the end of the emerging workpiece. Since the coating at this stage is preferably polymerized to a tack-free state, the absence of contact with a solid object is not essential although it is still preferred. In the embodiment illustrated, the sheet stock 15 passes over idler 65, exits from the gaseous medium within polymerization chamber 40 and enters water bath 69. Upon entering bath 69, the coated sheet stock passes under idler 73 which is insulated from and supported by idler support member 75 affixed to housing 41. After passing under idler 73, the coated sheet stock passes under idler 77 which is supported by and electrically insulated from tank 71 by idler support means 77–1. After passing under idler 77, the coated sheet stock is taken up by take-up reel 79 which is electrically insulated from and supported by reel support stand 81. Take-up reel 79 is driven by an electric motor 83 which causes it to rotate in a counterclockwise direction pulling sheet stock 15 from reel 13 and through the aforementioned baths 29 and 69 and polymerization chamber 40. Electric motor 83 is in electrical connection with ground via conductor 85 and with D.C. power source 25 via conductor 87, switch 89 and conductor 91.

Chamber 40 is continuously supplied with gas, e.g. helium, argon, nitrogen, carbon dioxide, preferably helium, via conduit 42, valve 44, conduit 46 and gas supply tank 48. Gas is continuously removed from chamber 40 via conduit 50, valve 52, and conduit 54 to a purification unit 56, e.g., a counter current gas scrubber wherein the gas entering from conduit 54 passes upward through a stream of water or other cleansing fluid entering purification unit 56 via conduit 58 at the top thereof and exiting via conduit 60 at or near the bottom of the same. The cleansed gas stream exits from the top of purification unit 56 and is returned to tank 48 via conduit 62, valve 64 and conduit 66.

Referring now to FIGURE 2, there is shown a cutaway view of the lower end of an electron-accelerator tube 100 comprising a main housing 101 containing a cathode assembly 103. Cathode assembly 103 comprises a cathode housing 105 having an elongated aperture 107 extending along a major portion of its lower side. Positioned within housing 105 is a pair of spaced apart bus bars 109 and 111 which hold between them in electrical communication therewith a plurality of tungsten-wire filaments 113 which serve as cathodes. Aperture 107 is of a size and configuration such as to direct a sheet of electrons emitted by the filaments 113 to the window area. In embodiments employing a scanned beam, a changing magnetic field is employed to direct the electron beam so as to achieve the desired distribution of electrons at the window surface. In electrical connection with bus bars 109 and 111, respectively, are conductors 115 and 117, each of which in operation is in electrical connection with the negative terminal of a direct-current electrical power source, e.g. power source 25 via conductors 61–1 and 63–1 shown in FIGURE 1. Conductors 115 and 117 are insulated from housing 101 and housing 105. The energy delivered to the negative leads 115 and 117 is controlled by conventional electrical control means, not shown, so that a slight difference of electrical potential, e.g. 5 volts, is maintained between negative leads 115 and 117 to establish a current through the filaments 113.

A conductor 119 provides the positive lead and is in electrical connection with housing 101 and with ground. Affixed to the bottom end of housing 101 by suitable fastener means, e.g. bolts, clamps, screws, etc., is a heat sink and window-support grid 121. Grid 121 is shown in greater detail in FIGURE 3. In this embodiment, grid 121 is of copper or aluminum or an alloy thereof and has a centrally positioned, longitudinally extending aperture 123. A plurality of cross members 125 are seated in slots 127 and extend transversely across aperture 123. Grid 121 also has a plurality of threaded holes 129 for securing grid 121 to housing 101 and window-retaining block 151. Grid 121 also has a peripheral groove 131 shaped to receive a conduit 133 for bringing a heat exchange fluid, e.g. water, into heat-exchange relationship with grid 121.

Positioned below grid 121 is window-forming sheet 141, a thin metal sheet which may be of aluminum; an alloy of aluminum containing minor amounts of lithium, titanium, beryllium, magnesium, and/or thorium; stainless steel, etc. Window-forming sheet 141 is shown in FIGURES 2 and 3 in enlarged thickness to facilitate its location and identification in the drawings. It is positioned so as to completely cover aperture 123 and extend therefrom a sufficient distance to be secured to grid 121 by window-retaining block 151. Window-forming sheet 141 is in electrical communication with housing 101 and serves as an anode. Window-retaining block 151 is provided with a centrally positioned aperture 153 of essentially equal size and configuration as that of aperture 123 and has a plurality of threaded holes 155. Aperture 153 frames the window proper. The threaded holes 155 provide means for securing window-retaining block 151 to grid 121 so as to clamp window-forming sheet 141 to grid 121. Window-retaining block 151, window-forming sheet 141, grid 121 and housing 101 are fastened together as hereinbefore described using, where necessary, suitable gaskets, sealing rings, etc., not shown, so as to form a vacuum-type seal of the lower end of the housing 101. Also shown in FIGURE 2 is a portion of sheet stock 15 of FIGURE 1 passing through an electron beam from the electron accelerator above described.

The polymerization-effecting electrons are provided by accelerating electrons in an evacuated tube, i.e. tube 100, and permitting the electrons to issue from the tube through an appropriate electron window such as the aforedescribed window-forming sheet 141 onto the coating to be polymerized. To provide area coverage, the high-energy electrons may be caused to issue from the tube in the form of a sheet, and the object to be irradiated may be moved through the electron sheet. The electron-emission unit above described is merely representative of a number of such devices which are suitable for this purpose. In one such device, electrons are accelerated as a narrow beam within an evacuated tube, and then a rapid scanning movement is imparted to the electron beam before it passes through the electron window and issues from the tube. In another such device, an electron beam is focused into sheet form within the tube by a system of cylindrical electron optics. See, for example, U.S. Patents 2,602,751 and 2,680,814. Where precise focusing is not essential, the electron-emitting cathode or cathodes may simply be partially enclosed in a suitable housing within the tube which restricts and directs the electron beam to the electron window as in the emitter described and illustrated in the drawings.

The main housing 101, the window-forming sheet 141, window support grid 121 and window-retaining block 151 with suitable gaskets, fastener means, etc., enclose and define an essentially gas-tight emission chamber which is substantially gas-evacuated by conduit and pumping means, not shown, e.g. to an air pressure as low as about $10^{-5}$ mm. Hg. The electron window-forming sheet 141 through which the electrons issue from the acceleration tube is a thin sheet of relatively light metal and should be as thin as feasible, e.g. 0.001 inch, in order that the electrons may pass therethrough with minimum loss of energy. On the other hand, window-forming sheet 141 must have a sufficient mechanical strength to withstand a pressure differential of about one atmosphere since the interior will be exposed to the evacuated emission chamber and the exterior ordinarily will be exposed to atmosphere pressure.

The amount of beam current which can be transmitted through the electron window is determined by the physical properties of the window and the energy of the impinging beam. Part of the beam energy is inevitably given up in the form of heat while electrons are passed through the window. The grid 121 and window-retaining block 151 provide means for heat exchange with the window. Conduit 133 provides means for additional heat transfer via the circulation of a suitable coolant therethrough. The spacing of the grid components 125 represents a compromise between the advantages of maximum physical support and heat absorption on the one hand and the advantages of minimizing interception of electrons passing between cathode and window-forming sheet 141 which serves as an anode. Other electron accelerator designs are described by A. J. Gale in U.S. Patent 2,722,620 and by W. D. Coolidge in U.S. Patent 1,907,507.

While the illustrated embodiment of the invention is one wherein the work to be coated is sheet material, it will be understood that the workpiece may be a series of individual objects which pass through the coating bath suspended from an overhead conveyor. In such an embodiment, the positions of the electron acceleration units would be modified in accordance with the shape and size of the workpiece, e.g. as by lateral displacement from the path of the conveyor-supported and freshly coated workpiece. It will also be understood that where the work is sheet material, the means for feeding, conveying, charging and collecting the sheet material may be modified in a variety of ways and still perform the functions of the corresponding means illustrated.

Referring now specifically to the coating material, "painting" by electrically induced deposition is herein meant to include the deposition of finely ground pigment and/or filler in the binder, i.e. the ionizable resin and vinyl monomer mix, the deposition of binder without pigment and/or filler or having very little of the same, but which can be tinted if desired, and the deposition of other water-reducible surface coating compositions containing the binder which might be considered to be broadly analogous to enamel, varnish, or lacquer bases, and the coating material for such deposition is herein termed a "paint." Thus, the binder, which is converted to a water-resistant film by the electrodeposition and ultimately converted to a durable film resistant to conventional service conditions by electron initiated polymerization, can be all or virtually all that is to be deposited to form the film, or it can be a vehicle for pigmentary and/or mineral filler material and/or other resins on which it exerts the desired action for depositing the film.

The binder is preferably a solution or mixture of a polycarboxylic acid resin having alpha-beta, olefinic unsaturation and vinyl monomers. The percentage of vinyl monomers advantageously is above about 1 and below about 15, preferably above about 7 and below about 14.5, more preferably about 9 to about 14 percent by weight of the organic binder.

The carboxylic acid resin is characterized in having a molecular weight above about 1000, advantageously in the range of about 2,000 to about 20,000 where the resin is a polyester type resin. With acrylic or other vinyl resins, the molecular weight is advantageously above about 5,000, e.g. in the range of about 5,000 to about 50,000 or higher. The resin is further characterized in having about 0.5 to about 3.0, preferably about 0.8 to about 2.0, alpha-beta olefinic unsaturation units per 1,000 units molecular weight, an acid number above about 30, e.g. 30 to 300, commonly 40 to 120, and an electrical equivalent weight in the range of about 1,000 to about 20,000, preferably 1,000 to 3,000. The resins employed herein are characterized in deposition behavior in that their deposition is essentially directly proportional with the direct current passing through the bath. This results from the fact that a film of high specific resistance builds with deposition. The resins employed in the method of the preferred embodiment deposit as a film that is (1) substantially uniform in thickness providing the workpiece is of such configuration that substantially equal electrical inducement to coating can be achieved at all surfaces thereof for a significant period of time during the coating process, (2) essentially water insoluble, (3) of high specific resistance, (4) terminates at a maximum thickness for a given voltage, and (5) is quickly polymerizable by an electron beam to tack-free state. Electrically induced deposition of polycarboxylic acid resins which meet the first four of these properties is disclosed by A. E. Gilchrist in U.S. Patent 3,230,162.

Radiation induced polymerization, including the use of an electron beam as the source of radiant energy, is exemplified in the art by U.S. Patents 3,247,012; 3,188,229; 3,188,228; 3,188,165; 3,170,892; 3,146,146; 3,137,674; 3,131,139; 3,107,206; 3,088,791; 3,077,420; 3,077,419; 3,077,418; 3,077,417; 3,075,904; 3,013,895; 2,999,056; 2,964,456; 2,956,904; 2,955,953; 2,921,006; 2,904,481; and 2,900,277.

The novel paint binders of this invention are characterized by being both electrodepositable in the manner of the resins of the aforementioned Gilchrist patent and electron polymerizable by the methods set forth in the other patents hereinbefore listed.

Referring now specifically to bath 29, the aqueous dispersion will contain between about 0.5 and about 40 percent by weight of the dispersed binder material, advantageously about 3 to about 12 percent. The water soluble amino compound employed as a dispersal assistant is present somewhat in excess of the amount necessary to effect intimate dispersion of the resin and to impart anionic polyelectrolyte behavior to the same. The optimum quantity of amino compound to be employed will vary with the acid number of the resin. If the resultant pH is sufficiently high, the bath will absorb $CO_2$ from the atmosphere unless a controlled atmosphere is employed. The concentration of the amino compound or compounds will also affect the electrical resistance of the bath and is deemed excessive when the bath resistance falls substantially below about 500 ohm-cm. The proportion of amine used is in excess of the minimum amount necessary for imparting anionic polyelectrolyte behavior to the particular binder resin or resin mixture in the bath. Concentrations of about 1.5 to about 5.3 times such minimum have been found suitable. Specific resistance of the bath is advantageously between about 700 and about 1000 ohm-cm. Higher bath resistance will result in a thinner coating at a given potential difference and vice versa. A bath of pH as low as about 5 and as high as about 10 can be used. Advantageously, the pH is between about 6.5 and about 8.5, preferably between about 7.0 and about 7.5.

Bath viscosity is advantageously maintained below about 30 times the viscosity of water. Bath temperatures in the range of about 15° to about 50° C. facilitate maintenance of bath stability and inhibit intrabath polymerization.

The term "water soluble amino compound" as herein employed includes ammonia and water soluble amines. Ammonia is less advantageous in this process for partially neutralizing the acid resin or resin mixture because it is highly volatile at operating temperatures and small additions of it can cause comparatively large changes in the pH of the bath. The amines used are amines that are soluble in water at 20° C. to the extent of at least about 1% basis weight of solution and include hydroxy amines, polyamines and monoamines such as: monoethanolamine, diethanolamine, triethanolamine, N-methyl ethanolamine, N-amino-ethylethanolamine, N-methyl diethanolamine, monoisopropanolamine, diisopropanolamine, triisopropanolamine, "poly-glycol amines" such as $$HO(C_2H_4O)_2C_3H_6NH_2$$

hydroxylamine, butanolamine, hexanolamine, methyldiethanolamine, octanolamine, and alkylene oxide reaction products of mono- and polyamines such as the reaction product of ethylene diamine with ethylene oxide or propylene oxide, lauryl amine with ethylene oxide, etc., ethylene diamine, diethylene triamine, triethylene tetramine, hexamethylene tetramine, tetraethylene pentamine, propylene diamine, 1,3 - diaminopropane, imino-bis-propyl amine, and the like; and mono-, di- and tri-lower alkyl ($C_1$–$C_8$) amines such as mono-, di- and triethyl amine.

To supplement the carboxylic acid resin in the bath as operations continue, additional binder concentrate composition is added continuously or incrementally. This concentrate optionally contains pigment. For ease of dispersion, the concentrate is advantageously in the form of a concentrated aqueous dispersion containing on a pigment and filler-free basis, about 50–95 percent by weight of polycarboxylic acid resin (straight or extended) and about 1–10 percent by weight water soluble amino compound based on the weight of the polycarboxylic acid resin, and the balance water.

The terms "radiation," "ionizing radiation," and "radiant energy" as employed herein mean radiation having a minimum energy of, or equivalent to 50,000 electron volts. The preferred method of curing films of the instant paint binders upon the substrates to which they have been applied is by subjecting such films to a beam of polymerization effecting electrons which at its source of emission, i.e. upon emerging from the electron window, is within the range of, or equivalent to, about 100,000 to about 450,000, preferably about 200,000 to about 350,000, electron volts.

By varying the space between the electron source and the film in relation to the potential of the beam the difference in polymerization rates with depth can be minimized. Within the aforementioned range of potentials, it is preferred to maintain a minimum voltage of about 25,000 volts per inch separation between emitting means and the film to be cured. In accordance with this process, the distance between emitting means and the film on the workpiece can be varied from about 2 feet to the minimum clearance compatible with the contours of the workpiece. Ordinarily, a space range of about 2 to about 18 inches will be most efficient. The correlation of space distance with emission potential becomes increasingly important with an increase in either space distance or film depth. At the closer spacings, voltages in the lower portion of the range can be successfully employed. Higher voltages within the range are advantageously employed at the greater distances to provide the desired uniformity of polymerization rates with depth. When operating in the range of about 200,000 to 300,000 electron volts spacings in the range of about 2 to about 12 inches are preferred.

Although the tolerance to overexposure will vary somewhat with film composition, the time required to effect substantially complete polymerization of the film at its maximum depth ordinarily should not be greater than twice the time required to polymerize the most easily polymerized portion of the film. Preferably, this time is less than 1.5 times the period required to obtain the first polymerization. The temperature of the film should be insufficient to cause significant evaporation of the most volatile component thereof both before and during polymerization. Keeping within these limitations, dose rates in the range of about 0.01 to about 15, preferably 0.1 to 10/megarad/sec. have been found suitable.

The term "Rad." as employed herein means that dose of radiation which results in the absorption of 100 ergs of energy per gram of absorber, i.e. coating film.

The term "acrylic monomer" as used herein means an alpha-beta monounsaturated monocarboxylic acid or esters thereof and includes, but not by way of limitation, acrylic acid, alkacrylic acids, e.g. methacrylic acid, monohydric alcohol esters of acrylic acid and alkacrylic acids, e.g. glycidyl methacrylate, 2-hydroxyethyl methacrylate, etc.

The acid number of resins without appreciable anhydride groups can be determined with KOH by the ASTM standard method 555–54. If appreciable anhydride groups are present, the acid number can be determined by refluxing a 1.5–2 gram sample of the portion of the resin for one hour with 50 ml. of 0.5 N aqueous KOH and 25 ml. of pyridine, then back titrating with 0.5 N HCl of a phenolphthalein end point.

The electrical equivalent weight of a given resin or resin mixture is herein defined as that amount of resin or resin mixture that will deposit per Faraday of electrical energy input under the conditions of operation hereinafter set forth. For this purpose the value of one Faraday in coulombs is herein taken to be 107.88 (atomic weight of silver)÷0.001118 (grams of silver deposited by one coulomb from silver nitrate solution) or 96,493. Thus, if 0.015 gram of coating, the binder polycarboxylic acid resin moiety of which is 90% by weight and the balance of which is amino compound used to disperse it in the bath is transferred and coated on the anode per coulomb input to the process, the electrical equivalent weight of the resin is about 1303 or $$0.015 \times 0.9 \times 107.88 \div 0.001118$$

By way of further illustration, the electrical equivalent weight of a particular polycarboxylic acid resin or resin mixture can be found simply and conveniently for typical process conditions standardized on as follows: a polycarboxylic acid resin concentrate is made up at 65.56° C. (150° F.) by thoroughly mixing 150 grams of polycarboxylic acid resin, 8 grams of distilled water and diisopropanol amine in an amount sufficient to yield resin dispersion pH of 7.8 or slightly lower after the concentrate has been reduced to 5% by weight resin concentration with additional distilled water. The concentrate is then diluted to one liter with additional distilled water to give 5% resin concentration in the resulting dispersion. (If a slight insufficiency of the amine has been used, and the dispersion pH is below 7.8, the pH is brought up to 7.8 with additional diisopropanol amine.) The dispersion is poured into a metal tank, the broadest side walls of which are substantially parallel with and 2.54 cm. out from the surfaces of a thin metal panel anode. The tank is wired as a direct current cathode, and the direct current anode is a 20 gauge, 10.17 cm. (4 inches) wide, tared steel panel immersed in the bath 7.62 cm. (3.5 inches) deep. At 26.67° C. (80° F.) bath temperature, direct current is then impressed from anode to cathode at 100 volts for one minute from an external power source, the current measured by use of a coulometer, and the current turned off. The anode panel is removed immediately, rinsed with distilled water, baked for 20 minutes at 176.67° C. (350° F.) and weighed. All volatile material such as water and amine is presumed to be removed from the film for practical purposes by the baking operation. The difference between tared weight of the fresh panel and final weight of the baked panel divided by the coulombs of current used, times 107.88, divided by 0.001118 gives the electrical equivalent weight of the resin for purposes of this invention.

The following examples are illustrative of coating materials that are used in the practice of this invention:

EXAMPLE 1

A silicone-modified, polyester type, polycarboxylic acid resin is prepared from the following components:

|  | Moles | Grams | Ml. |
|---|---|---|---|
| Maleic anhydride | 0.63 | | |
| Tetrahydrophthalic anhydride | 1.61 | | |
| Neopentyl glycol | 2.48 | | |
| Polysiloxane (25% by weight) | | 175.0 | |
| Xylene | | | 70 |
| Hydroquinone | 0.2827 | | |

The polysiloxane employed is a commercially available hydroxy-functional, cyclic, polysiloxane having the following properties:

Hydroxy content, Dean Stark:
    Percent condensible _____ 5.5
    Percent free _____ 0.5
Average molecular weight _____ 1600
Combining weight _____ 400
Refractive index _____ 1.531–1.539
Softening point, Durran's:
    Mercury method, degrees F. _____ 200
    At 60% solids in xylene—
        Specific gravity at 77° F. _____ 1.075
        Viscosity at 77° F., centipoises___ 33
    Gardner-Holdt _____ A–1

The glycol, the polysiloxane and the xylene are added to a four neck liter flask, heated to a temperature of about 160 to about 165° C. for about 2 hours while being stirred and under a nitrogen atmosphere. The reaction mixture is cooled to about 125 to about 130° C., the maleic anyhydride, the tetrahydrophthalic anyhydride and the hydroquinone are added and the temperature is increased slowly to about 190 to about 200° C. which is maintained for about 3.5 hours and to an acid number of about 47.7. The heating is stopped, the xylene is stripped, and the mixture is cooled to about 80° C. About 45.0 grams styrene and about 45.0 grams methylmethacrylate are added. The acid number of this binder solution is then determined to be about 43.4. This binder solution is hereinafter termed Binder A.

A mill base is prepared from the following components:

|  | Grams |
|---|---|
| Titanium dioxide | 90 |
| Binder A | 50.8 |
| Styrene | 7.0 |
| Methylmethacrylate | 7.0 |

This mixture is placed in a ball mill and milled for approximately 38 hours. This mill base is hereinafter termed Mill base 1.

A resin-monomer dispersion is prepared from the following components:

|  | Grams |
|---|---|
| Mill base 1 | 13.8 |
| Binder A | 66.2 |
| Diisopropanolamine | 7.3 |
| Distilled water | 312.7 |

The amine and water are blended in a high speed mixer. The mill base and the binder are premixed and then poured into the vortex of the aqueous mixture of amine and water. The resultant mix is blended for 10 minutes. Blending is stopped for 5 minutes and then continued for 5 minutes. Blending is stopped for 20 minutes and then continued for 5 minutes. After 5 minutes, the dispersion is stirred with 400 grams of distilled water. The resulting emulsion has about 10 wt. percent solids.

This emulsion is placed in a tank which serves as the cathode of an electrodeposition cell. Steel sheet stock is coated by providing a difference of electrical potential between the cathode and the sheet stock (anode) of about 100 volts for about 1 minute.

The sheet stock is removed from the bath into a nitrogen atmosphere and the essentially uniform and continuous coating thereon is polymerized to tack-free state by passing the coated panel through an electron beam. The conditions of iradiation employed are as follows:

Voltage—275 electron kilovolts
Current—15 milliamperes
Total dosage—10 megarad
Passes through beam—2
Line speed—10 ft./min.
Atmosphere—Nitrogen
Distance, electron window to work—7"

EXAMPLE 2

A paint is prepared, electrodeposited from an aqueous bath upon a metal panel and polymerized by an electron beam as in the previous example except for the differences hereinafter set forth.

To a reaction vessel are added the following materials:

|  | Moles | Grams | Ml. |
|---|---|---|---|
| (a) Methyl methacrylate | 2.6 | | |
| (b) Ethyl acrylate | 5.0 | | |
| (c) Glycidyl methacrylate | 1.7 | | |
| (d) Methacrylic acid | 2.0 | | |
| (e) Xylene | | | 1,000 |
| (f) Benzoyl peroxide | | 10 | |
| (g) Hydroquinone | | 0.2 | |

The xylene is heated to 130° C. under a nitrogen blanket and stirred continuously. The monomers (a), (b), and (c), the reaction initiator (f) and the hydroquinone (g) are added to the xylene. The monomers (a), (b) and (c) are added separately and incrementally over a period of about 3 hours. The charge is heated at 130° to 133° C. for about 3 hours. The charge is cooled to about 50° C.

The methacrylic acid (d) is added to the charge and the temperature is raised to 138° C. gradually and maintained until an acid number of about 60 is obtained. The xylene is then removed.

The acrylic polymer thus formed is admixed with styrene and methyl methacrylate in the same proportions as in the preceding example.

The voltage employed in electrodepositing the binder solution is about 170 volts. The bath pH is about 7.3. The amine employed is diisopropanolamine.

The following conditions are employed in irradiating the coated panels thus prepared.

Potential—295 kv.
Current—1 milliampere
Atmosphere—Helium
Line speed—6.5, 3.2 and 1.6 cm./sec.
Distance, emitter to panel—10″
Passes through beam—2
Dose—2.5, 5 and 10 megarad

EXAMPLE 3

A polyester type, polycarboxylic acid resin is prepared from the following components:

|  | Grams |
| --- | --- |
| Fumaric acid | 222.9 |
| Tetrahydrophthalic anhydride | 925.1 |
| Trimetholpropane monoallyl ether | 1477.2 |

The above materials are mixed with 250 ml. of xylene and 0.02% hydroquinone. The mixture is heated at 190° C. until 130 ml. of water is removed and an acid number of about 50 is reached. The solvent is removed with a stream of nitrogen gas and a yield of about 2486 grams is obtained.

Using a conventional blender, 300 ml. of water is mixed with 26 ml. of 1 normal diisopropanolamine. Thirty (30) grams of the resin is slowly added and stirring is continued for 30 minutes. The resulting dispersion is diluted with water to 390 grams total weight. This material has approximately 0.9 alpha-beta olefinic unsaturation groups per 1,000 units molecular weight.

Steel panels pretreated in a conventional zinc-phosphating process are used as anodes in an electrodeposition cell wherein the aforementioned dispersion serves as the electrolyte and its retainer, the coating tank, serves as the cathode. The immersed area of the anode is 37.4 cm.$^2$ (5.2 cm. x 7.2 cm.). The cathode-anode spacing is about 2 inches. A potential difference between anode and cathode of about 100 volts is applied for about 1 minute and a resinous film of essentially uniform depth is deposited. The initial current between anode and cathode is about 0.82 ampere and this drops with increase of electrical resistance attributable to the deposited film to about 0.07 ampere. This results in a deposition of about 0.218 gram of resin upon the panel with a utilization of about 8.8 coulombs of charge or an electrical equivalent weight of $(.218)(96,493)/(8.8) = 2100$.

The anode is removed from the bath and contacted with an electron beam. The distance between the electron window and the coated panel is about 12 inches. The atmosphere is air. Electron emission is at 280,000 electron volts. The coating is subjected to a total dosage of about 40 megarads and a tack-free film is obtained.

This procedure is repeated except that a binder solution is prepared by admixing styrene monomer with the resin prior to dispersion in the bath. Upon irradiation in like manner, it is found that a tack-free film is obtained with a dosage of about 10 megarad. The mixture employed contains about 12% styrene and about 88% resin.

This procedure is repeated except that one-half of the styrene is replaced with methyl methacrylate.

All disclosures of the patents referred to herein which are in no way in conflict with the disclosure of this specification are incorporated herein by reference.

The foregoing examples are solely for purposes of illustration and should not be considered as limitations upon the true scope of the invention as set forth in the appended claims issuing with this specification.

What is claimed is:
1. A method for coating an electrically conductive object comprising in combination:
  (1) immersing said object in a coating bath comprising an aqueous dispersion of a water-ionizable amino compound and a film-forming, polymerizable, organic coating material, at least a major proportion of which is a polycarboxylic acid resin that deposits upon a relatively positive electrically conductive object substantially directly proportional to direct electric current passed through said bath and is further characterized in having
    (a) an acid number in the range of about 30 to about 300,
    (b) a molecular weight in excess of about 1,000 and
    (c) about 0.5 to about 3.0 alpha-beta olefinic unsaturation units per 1,000 units molecular weight,
  (2) providing a direct electric current through said bath sufficient to effect deposition of a film of said coating material upon said object by providing a difference of electrical potential between said object and an electrode that is
    (a) spaced apart from said object,
    (b) in contact with said bath, and
    (c) electrically negative in relation to said object,
  (3) providing in contact with said bath an enclosed polymerization zone charged with a substantially inert gaseous medium, said aqueous bath forming a fluid seal of a portion of said polymerization zone and providing inlet means through which said object may pass from said aqueous bath into said polymerization zone,
  (4) transferring the resultant coated object from said aqueous bath into said polymerization zone, and
  (5) polymerizing said film on said object by contacting said film immediately after removal from said aqueous bath with ionizing radiation having energy at least equivalent to 50,000 electron volts.

2. The method of claim 1 wherein the resultant object and polymerized film thereon is removed from said polymerization zone into a liquid bath which forms a fluid seal of a portion of said polymerization zone.

3. The method of claim 1 wherein said polymerization zone is charged with helium.

4. The method of claim 1 wherein said polymerization zone is charged with nitrogen.

5. The method of claim 1 wherein said difference of electrical potential is in the range of about 50 to about 500 volts.

6. The method of claim 1 wherein said difference of potential is in the range of about 100 to about 300 volts.

7. The method of claim 1 wherein said ionizing radiation is a beam of polymerization effecting electrons having an average potential within the range of about 100,000 to about 450,000 electron volts.

8. A method for coating an electrically conductive object comprising in combination:
  (1) immersing said object in a coating bath comprising an aqueous dispersion of a water-ionizable amino compound and a film-forming coating material at least a major proportion of which is a polymerizable organic binder consisting essentially of a minor component of vinyl monomers and a major component of a polycarboxylic acid resin that deposits upon a relatively positive electrically conductive object substantially directly proportional to direct current passed through said bath and is further characterized in having
    (a) an acid number in the range of about 30 to about 300,
    (b) an electrical equivalent weight in the range of about 1,000 to about 20,000, (c) a molecular weight in excess of about 1,000, and (d) about 0.5 to about 3.0 alpha-beta olefinic unsaturation units per 1,000 units molecular weight (2) providing a direct electric current through said bath sufficient to effect deposition of a film of said coating material upon said object that is substantially electrically irreversible under the conditions of deposition by providing a difference of electrical potential between said object and an electrode that is (a) spaced apart from said object,
(b) in contact with said bath, and
(c) electrically negative in relation to said object, (3) providing in contact with said bath an enclosed polymerization zone charged with a substantially inert gaseous medium, said aqueous bath forming a fluid seal of a portion of said polymerization zone and providing inlet means through which said object may pass from said aqueous bath into said polymerization zone, (4) transferring the resultant coated object from said aqueous bath into said polymerization zone, and (5) polymerizing said film on said object by contacting said film immediately after removal from said aqueous bath with ionizing radiation having energy at least equivalent to 50,000 electron volts.

9. The method of claim 8 wherein the resultant object and polymerized film thereon is removed from said polymerization zone into a liquid bath which forms a fluid seal of a portion of said polymerization zone.

10. The method of claim 8 wherein said gaseous medium consists essentially of helium.

11. The method of claim 8 wherein said gaseous medium consists essentially of nitrogen, carbon dioxide or argon.

12. The method of cliaim 8 wherein said object is electrically conductive sheet stock which in the operation of said method extends through said coating bath and said polymerization zone.

13. The method of claim 12 wherein said sheet stock is metal.

References Cited

UNITED STATES PATENTS

| | | | |
|---|---|---|---|
| 3,437,514 | 4/1969 | Burlant | 204—181 |
| 2,530,366 | 11/1950 | Gray | 204—181 |
| 2,900,277 | 8/1959 | Schmitz et al. | 117—93.31 |
| 3,137,674 | 6/1964 | Marans et al. | 117—93.31 |
| 3,146,146 | 8/1964 | Anderson | 117—93.31 |
| 3,157,560 | 11/1964 | Livingston et al. | 117—93.31 |
| 3,188,229 | 6/1965 | Graham | 117—93.31 |
| 3,230,162 | 1/1966 | Gilchrist | 204—181 |
| 3,247,012 | 4/1966 | Burlant | 117—93.31 |
| 3,378,477 | 4/1968 | Gentles et al. | 204—181 |
| 3,403,088 | 9/1968 | Hart | 204—181 |

OTHER REFERENCES

Bjorksten et al., Polyesters and Their Applications, Reinhold Publishing Corp., New York, 1956, pp. 157, 158.

HOWARD S. WILLIAMS, Primary Examiner